United States Patent
Kitayoshi et al.

(10) Patent No.: US 8,998,482 B2
(45) Date of Patent: Apr. 7, 2015

(54) AGITATION APPARATUS

(75) Inventors: Masanori Kitayoshi, Toyota (JP);
Yoshiaki Ebine, Aichi-ken (JP); Atsushi Sugihara, Toyota (JP); Kiwamu Kobayashi, Seto (JP); Takashi Kono, Okazaki (JP); Yasuyuki Nakane, Toyota (JP); Kenshu Maruta, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/389,628

(22) PCT Filed: Oct. 23, 2009

(86) PCT No.: PCT/JP2009/068283
§ 371 (c)(1),
(2), (4) Date: Feb. 9, 2012

(87) PCT Pub. No.: WO2011/048699
PCT Pub. Date: Apr. 28, 2011

(65) Prior Publication Data
US 2012/0195159 A1    Aug. 2, 2012

(51) Int. Cl.
*B01F 7/00* (2006.01)
*B01F 7/28* (2006.01)
*H01M 4/139* (2010.01)

(52) U.S. Cl.
CPC .............. *B01F 7/285* (2013.01); *B01F 7/0055* (2013.01); *H01M 4/139* (2013.01)

(58) Field of Classification Search
USPC ......... 366/244, 349, 608, 341, 342, 241, 242, 366/245, 246, 247, 248, 249, 250, 251, 279, 366/315, 280, 281, 282, 283, 129
See application file for complete search history.

(56) References Cited

U.S. PATENT DOCUMENTS

| | | | |
|---|---|---|---|
| 372,043 A * | 10/1887 | Pusey | 366/342 |
| 1,726,125 A * | 8/1929 | Rowand | 366/315 |
| 2,390,579 A * | 12/1945 | Fritzberg | 366/263 |
| 4,490,049 A * | 12/1984 | Sanders et al. | 366/279 |

(Continued)

FOREIGN PATENT DOCUMENTS

| | | |
|---|---|---|
| CN | 1282626 | 2/2001 |
| JP | 6-114254 | 4/1994 |

(Continued)

OTHER PUBLICATIONS

International Search Report in International Application No. PCT/JP2009/068283; Mailing Date: Feb. 9, 2010.

*Primary Examiner* — Tony G Soohoo
*Assistant Examiner* — Anshu Bhatia
(74) *Attorney, Agent, or Firm* — Finnegan, Henderson, Farabow, Garrett & Dunner, LLP

(57) ABSTRACT

An agitation apparatus (100) has a substantially cylindrically shaped agitation vessel (102); a rotation shaft (150) provided along the central axis of the agitation vessel (102); a substantially cylindrically shaped agitation member (104) having an outer diameter smaller than the inner diameter of the agitation vessel (102) and being fitted to the rotation shaft (150) so as to rotate concentrically with an inner circumferential surface of the agitation vessel (102); and a plurality of through holes (162, 164) formed through the agitation member (104) in radial directions of the agitation member. In the agitation apparatus (100), a gap between the inner circumferential surface of the agitation vessel (102) and the outer circumferential surface of the agitation member (104) is partially varied along a vertical direction of the agitation member (104). For example, the gap between the inner circumferential surface of the agitation vessel (102) and the outer circumferential surface of the agitation member (104) is wider at a lower portion (S2) of the agitation member (104) than at an upper portion (S1) of the agitation member (104).

16 Claims, 13 Drawing Sheets

(56) References Cited

U.S. PATENT DOCUMENTS

| | | | |
|---|---|---|---|
| 5,061,456 A * | 10/1991 | Brazelton et al. | 366/316 |
| 6,325,310 B1 | 12/2001 | Inoue | |
| 7,229,206 B2 * | 6/2007 | Whitney | 366/343 |

FOREIGN PATENT DOCUMENTS

| | | |
|---|---|---|
| JP | 11-347388 | 12/1999 |
| JP | 2001-25653 | 1/2001 |
| JP | 2001-38184 | 2/2001 |
| JP | 2003-231789 | 8/2003 |
| JP | 2005-129482 | 5/2005 |
| JP | 2006-164596 | 6/2006 |
| JP | 2006-212489 | 8/2006 |
| JP | 2006-236658 | 9/2006 |
| JP | 2007-125454 | 5/2007 |

* cited by examiner

US 8,998,482 B2

AGITATION APPARATUS

CROSS-REFERENCE TO RELATED APPLICATIONS

This application is a national phase application of International Application No. PCT/JP2009/068283, filed Oct. 23,2009, the contents of which are incorporated herein by reference.

TECHNICAL FIELD

The present invention relates to an agitation apparatus, and more particularly to an agitation apparatus usable for agitating and mixing, for example, electrode active materials, conductive agents, binder agents, and solvents.

BACKGROUND ART

An example of such an agitation apparatus has a cylindrically shaped agitation vessel, and a substantially cylindrically shaped agitation member that has an outer diameter smaller than the inner diameter of the agitation vessel and rotates concentrically with the inner circumferential surface of the agitation vessel. The agitation member has a multiplicity of small holes formed in radial directions through its cylindrical portion. In the agitation apparatus, the agitation member rotates at high speed while keeping a very small clearance from the inner circumferential surface of the agitation vessel. In association with the high-speed rotation of the agitation member, a centrifugal force acts on a material supplied to the agitation vessel. By the centrifugal force, the material is forced out in radially outward directions through the small holes formed in the agitation member, and is spread in a tubular thin film shape into a gap between the outer circumferential surface of the agitation member and the inner circumferential surface of the agitation vessel. At that time, the material is agitated between the surface of the material and the inner circumferential surface of the agitation vessel. Then, the material that has been agitated sufficiently to lower its viscosity is moved to the upper portion of the agitation vessel by the action of the centrifugal force and is discharged from the upper portion of the agitation vessel.

This type of agitation apparatus is disclosed in, for example, JP H11-347388 A (Patent Literature 1), JP 2005-129482 A (Patent Literature 2), JP 2006-236658 A (Patent Literature 3), and JP 2007-125454 A (Patent Literature 4).

CITATION LIST

Patent Literature

[Patent Literature 1] JP H11-347388 A
[Patent Literature 2] JP 2005-129482 A
[Patent Literature 3] JP 2006-236658 A
[Patent Literature 4] JP 2007-125454 A

SUMMARY OF INVENTION

Technical Problem

The just-described agitation apparatus agitates a material by rotating the agitation member while the material is being supplied in the agitation vessel. In this case, the agitation apparatus causes heat generation because of the friction caused by the material that is agitated between the agitation vessel and the agitation member. Lithium-ion secondary batteries use electrode slurry prepared by mixing an electrode active material, a conductive agent, a binder agent, a solvent, and so forth at a predetermined proportion and thereafter agitating the mixture with the agitation apparatus. When producing the electrode slurry, the mixture of an electrode active material, a conductive agent, a binder agent, a solvent, and so forth is agitated by the agitation apparatus. There are cases in which the just-mentioned mixture has a high viscosity at the initial stage of the supplying of the mixture to the agitation apparatus.

The present inventors have investigated to use the agitation apparatus having a cylindrically shaped agitation vessel and an agitation member rotating concentrically in the cylindrically shaped agitation vessel for the purpose of agitating the electrode slurry efficiently. However, when using the agitation apparatus to agitate a paste-like material with a high viscosity, a large friction occurs between the agitated material and the agitation vessel and between the agitated material and the agitation member, which may consequently produce high-temperature heat. On the other hand, if it is attempted to reduce such heat generation, process efficiency will be decreased. The present inventors have desired to keep the heat generation low and at the same time improve the process efficiency in the process of agitating such a material.

The present inventors have found that in order to keep the heat generation low with the above-described agitation apparatus, it is desirable to widen the gap between the inner circumferential surface of the agitation vessel and the outer circumferential surface of the agitation member. In other words, widening the gap between the inner circumferential surface of the agitation vessel and the outer circumferential surface of the agitation member can lessen the friction caused in the material being agitated in the gap between the agitation vessel and the agitation member, keeping the generated heat low. However, when the gap between the inner circumferential surface of the agitation vessel and the outer circumferential surface of the agitation member is wide, the process efficiency of the agitation process decreases. On the other hand, narrowing the gap between the inner circumferential surface of the agitation vessel and the outer circumferential surface of the agitation member increases the friction caused in the material being agitated in the gap between the agitation vessel and the agitation member, resulting in a considerable increase in the temperature of the material.

In addition, some kinds of materials may not require an excessive agitation process. In such cases, it is desirable that the material be discharged from the agitation vessel at the stage where the material has been agitated to some extent. However, no agitation apparatus that can prevent such an excessive agitation process has been proposed. The present invention proposes various modifications to the above-described agitation apparatus that are suitable for various processes required by the materials.

Solution to Problem

According to the present invention, an agitation apparatus comprises: a substantially cylindrically shaped agitation vessel; a rotation shaft provided along the central axis of the agitation vessel; a substantially cylindrically shaped agitation member having an outer diameter smaller than an inner diameter of the agitation vessel and attached to the rotation shaft so as to rotate concentrically with the inner circumferential surface of the agitation vessel; and a plurality of through holes formed in radial directions through the agitation member, wherein a gap between the inner circumferential surface of the agitation vessel and the outer circumferential surface of the agitation member is partially varied along a vertical direction of the agitation member. This agitation apparatus can agitate a material to an appropriate degree and can suppress temperature increase appropriately because the gap between the inner circumferential surface of the agitation vessel and the outer circumferential surface of the agitation member is partially varied along a vertical direction of the agitation member.

In this case, the gap between the inner circumferential surface of the agitation vessel and the outer circumferential surface of the agitation member may be wider at a lower portion of the agitation member than at an upper portion of the agitation member. In this case, the gap between the inner circumferential surface of the agitation vessel and the outer circumferential surface of the agitation member is wider at the lower portion of the agitation member, so the friction caused in the material agitated in the gap between the agitation vessel and the agitation member can be alleviated, and the resulting heat generation can be kept low. On the other hand, the gap between the inner circumferential surface of the agitation vessel and the outer circumferential surface of the agitation member is narrower at the upper portion of the agitation member, so the friction caused in the material that is agitated in the gap between the agitation vessel and the agitation member is increased. As a result, a required agitation process can be performed. For example, the ratio (S10/S20) of a gap S10 between the agitation vessel and the agitation member at an upper end of the agitation member to a gap S20 between the agitation vessel and the agitation member at a lower end of the agitation member may be equal to or less than 0.95 (0.95≥S10/S20).

Alternatively, the gap between the inner circumferential surface of the agitation vessel and the outer circumferential surface of the agitation member may be wider at an upper portion of the agitation member than at a lower portion of the agitation member. In this case, the gap between the inner circumferential surface of the agitation vessel and the outer circumferential surface of the agitation member is wider at the upper portion of the agitation member, so the friction caused in the material agitated in the gap between the agitation vessel and the agitation member can be alleviated. This makes it possible to prevent the agitation process from being performed excessively at the upper portion of the agitation member. For example, the ratio (S10/S20) of a gap S10 between the agitation vessel and the agitation member at an upper end of the agitation member to a gap S20 between the agitation vessel and the agitation member at a lower end of the agitation member may be equal to or greater than 1.05 (1.05≤S10/S20).

In addition, the outer diameter of the agitation member may be different between the upper portion and the lower portion. In this case, the outer diameter of the agitation member may be smaller in the lower portion than in the upper portion. In addition, the agitation member may have a tapered shape such that the outer diameter thereof becomes gradually smaller from the upper portion toward the lower portion. When the outer diameter of the agitation member is smaller in the lower portion than in the upper portion, the gap between the inner circumferential surface of the agitation vessel and the outer circumferential surface of the agitation member is wider at the lower portion of the agitation member. As a result, the friction caused in the material that is agitated in the gap between the agitation vessel and the agitation member is alleviated, and the heat generation can be kept low.

The outer diameter of the agitation member may be smaller in the upper portion than in the lower portion. In this case, the agitation member may have a tapered shape such that the outer diameter thereof becomes gradually smaller from the lower portion toward the upper portion. When the outer diameter of the agitation member is smaller in the upper portion than in the lower portion, the gap between the inner circumferential surface of the agitation vessel and the outer circumferential surface of the agitation member is wider at the upper portion of the agitation member. As a result, the friction caused in the material that is agitated in the gap between the agitation vessel and the agitation member is alleviated in the upper portion of the agitation member, and an excessive agitation process can be prevented.

In addition, the inner diameter of the agitation vessel may be different between the upper portion and the lower portion. In this case, the inner diameter of the agitation vessel may be smaller at the upper portion of the agitation member than at the lower portion of the agitation member. Alternatively, the inner diameter of the agitation vessel may be smaller at the lower portion of the agitation member than at the upper portion of the agitation member.

Ones of the through holes formed in the lower portion of the agitation member may be larger than ones of the through holes formed in the upper portion of the agitation member. In addition, the through holes may penetrate through the agitation member so as to be inclined with respect to radial directions of the agitation member. The through holes may penetrate through the agitation member so as to be inclined forward of a rotation direction of the agitation member, from an inner portion of the agitation member toward an outer portion thereof, with respect to radial directions of the agitation member.

For a method of manufacturing a non-aqueous electrolyte secondary battery having a mixture layer formed by coating a metal foil with an electrode slurry containing an electrode active material, for example, the agitation apparatus according to the present invention may be used to agitate the electrode slurry in a step of agitating the electrode slurry.

DESCRIPTION OF EMBODIMENTS

Figure 1:
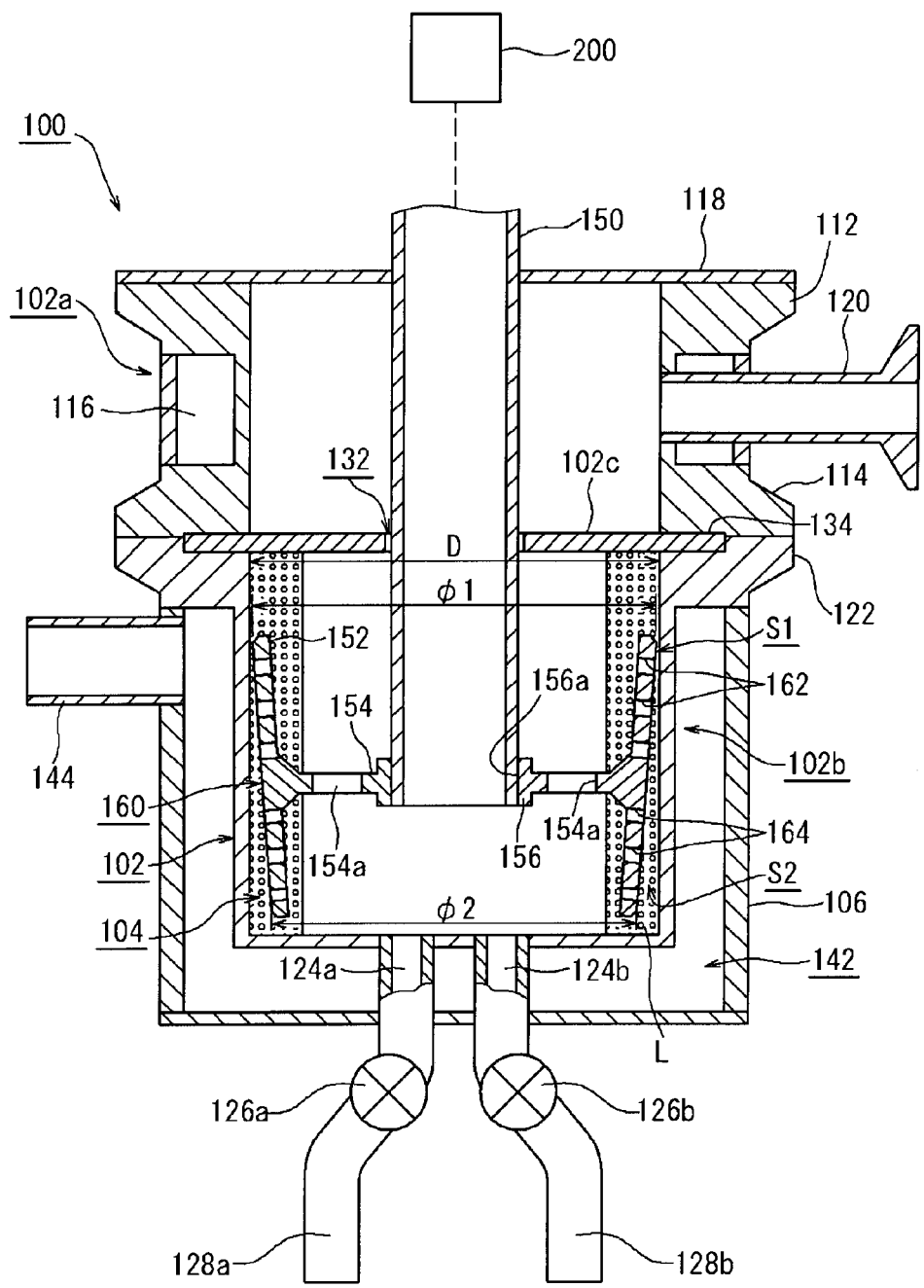
FIG. 1 is a cross-sectional view illustrating an agitation apparatus according to one embodiment of the present invention.

Hereinbelow, an agitation apparatus according to one embodiment of the present invention will be described with reference to the drawings. It should be noted that the present invention is not limited to the following embodiments. In the drawings, the members and components that exhibit the same workings are denoted by the same reference symbols as appropriate.

FIG. 1 is a vertical cross-sectional view illustrating an agitation apparatus 100. As illustrated in FIG. 1, the agitation apparatus 100 has an agitation vessel 102, an agitation member 104, and an outer vessel 106. In the present embodiment, the agitation vessel 102 is a container having a cylindrically shaped inner circumferential surface, and it has an upper case 102a, a lower case 102b, and a weir plate 102c.

The upper case 102a is a substantially cylindrically shaped container. The upper case 102a has flanges 112 and 114 extending radially outward, provided at the upper and lower end portions of the upper case 102a. A coolant chamber 116 to which coolant is supplied is formed in an outer peripheral portion of the upper case 102a. A lid 118 is provided on the upper end face of the upper case 102a. The cylindrical portion of the upper case 102a is provided with a discharge port 120 for a material L.

The lower case 102b is a closed-end cylindrical container having an inner circumferential surface having substantially the same inner diameter as that of the upper case 102a. It has a flange 122 extending radially outward provided at its upper portion. The bottom portion of the lower case 102b is provided with supply ports 124a and 124b for the material L at its lower portion. In this embodiment, the bottom portion of the lower case 102b is provided with a plurality of (two in the example shown in the figure) supply ports 124a and 124b, and supply pipes 128a and 128b having respective supply valves 126a and 126b are fitted to the supply ports 124a and 124b.

The upper case 102a and the lower case 102b are stacked vertically so that their internal spaces communicate with each other concentrically. The weir plate 102c is to fitted between the upper case 102a and the lower case 102b. The weir plate 102c is a disk-shaped member having a hole 132 at its center portion. In this embodiment, a recess 134 for fitting the weir plate 102c is formed in the upper end face of the lower case 102b. The weir plate 102c is sandwiched between the upper case 102a and the lower case 102b while it is fitted in the recess 134 formed in the upper end face of the lower case 102b.

The outer vessel 106 is a container that covers the bottom portion and the outer circumferential surface of the lower case 102b of the agitation vessel 102. A coolant chamber 142 to which coolant is supplied is formed between the lower case 102b and the outer vessel 106. A coolant supply pipe 144 for supplying the coolant to the coolant chamber 142 is connected to the outer vessel 106. The agitation vessel 102 is provided with a rotation shaft 150 to which the agitation member 104 is fitted. As illustrated in FIG. 1, the rotation shaft 150 penetrates through the lid 118 of the agitation vessel 102, and extends along the central axis of the agitation vessel 102 through the hole 132 formed at the center of the weir plate 102c. The rotation shaft 150 extends outside from a top portion of the agitation vessel 102. The rotation shaft 150 is connected to a driving apparatus 200 provided external to the agitation vessel 102.

The agitation member 104 is a substantially cylindrically shaped member. The outer diameter of the agitation member 104 is, as shown in FIG. 1, smaller than the inner diameter D of the agitation vessel 102. The agitation member 104 is fitted to the rotation shaft 150 so as to rotate concentrically with the inner circumferential surface of the agitation vessel 102. The agitation member 104 has a plurality of through holes 162 and 164 formed therein. In this embodiment, as illustrated in FIG. 1, the agitation member 104 has a cylindrical portion 152, an arm portion 154, and a boss portion 156. The agitation member 104 is accommodated in the lower case 102b of the agitation vessel 102.

The cylindrical portion 152 is a substantially cylindrically shaped portion having outer diameters $\phi 1$ and $\phi 1$ that are smaller than the inner diameter of the agitation vessel 102. In this embodiment, as illustrated in FIG. 1, the outer diameter $\phi 1$ of the upper portion of the cylindrical portion 152 is larger than the outer diameter $\phi 2$ of the lower portion of the cylindrical portion 152. The arm portion 154 extends radially from an axially mid-portion of the cylindrical portion 152. The boss portion 156 is provided at the center of the arm portion 154, and it is a portion to which the rotation shaft 150 is fitted. The cylindrical portion 152 of the agitation member 104 has the plurality of through holes 162 and 164 formed therein.

In this embodiment, the arm portion 154 extends radially inward from an axially mid-portion of the cylindrical portion 152. The arm portion 154 is formed continuously along a circumferential direction, and a plurality of holes 154a penetrating the arm portion 154 vertically are formed therein along a circumferential direction at a predetermined interval. The boss portion 156 is provided at the center of the arm portion 154 (i.e., the center of the cylindrical portion 152). The boss portion 156 has a fitting hole 156a formed therein, for fitting the rotation shaft 150 thereto. It is recommend that the fitting hole 156a have a structure for transmitting rotation of the rotation shaft 150 reliably (such as a working face in a circumferential direction, a key structure, and a spline).

As illustrated in FIG. 1, the material L is supplied to the agitation apparatus 100 through the supply ports 124a and 124b, which are provided in the bottom portion of the lower case 102b of the agitation vessel 102. The material L supplied to the agitation vessel 102 is urged and rotated in a circumferential direction by the high-speed rotation of the agitation member 104. At that time, by the centrifugal force acting on the material L, the material L is supplied to the gap between the agitation vessel 102 and the agitation member 104 through the through holes 162 and 164 formed in the agitation member 104. At that time, the material L that has flowed and entered the through holes 162 and 164 receives a strong force from the inner surfaces of the through holes 162 and 164, and flows out from the through holes 162 and 164 into a gap S between the agitation vessel 102 and the agitation member 104 by the centrifugal force.

As a result, the pressure of the material L in the gap S increases. In addition, the outflow of the material L from the through holes 162 and 164 into the gap S between the agitation vessel 102 and the agitation member 104 disturbs the flow of the material L in the gap S. Thereby, a required agitation effect can be obtained. Further, the material L rotates while it is being in intimate contact with the inner surface of the agitation vessel 102, in a hollow cylindrical thin film shape. At that time, because of the speed difference between the surface of the agitation member 104 and the inner surface of the agitation vessel 102, the material L receives a shearing force in a circumferential direction of the agitation vessel 102, and is agitated. In addition, the components contained in the material L are turned into fine particles.

To the agitation apparatus 100, the material L is continuously supplied through the supply ports 124a and 124b, which are provided in the bottom portion of the lower case 102b of the agitation vessel 102. As the agitation proceeds within the agitation vessel 102 as described above, the viscosity of the material L decreases, and the material L moves upward due to the centrifugal force. The material L that has been further agitated gradually moves toward the upper portion in the agitation vessel 102, then moves beyond the weir plate 102c between the upper case 102a and the lower case 102b, and flows out into the upper case 102a. The material L that has flowed into the upper case 102a is then discharged from the discharge port 120 provided for the upper case 102a.

In this embodiment, the outer diameter of the agitation member 104 is different between the upper portion and the lower portion. That is, as illustrated in FIG. 1, the outer diameter $\phi 2$ of the lower portion of the agitation member 104 is smaller than the outer diameter $\phi 1$ of the upper portion. In addition, the agitation member 104 has a tapered shape such that the outer diameter thereof becomes gradually smaller from the upper portion toward the lower portion.

In this embodiment, the outer diameter $\phi 1$ of the upper portion of the cylindrical portion 104 is larger than the outer diameter $\phi 2$ of the lower portion of the cylindrical portion 152, as illustrated in FIG. 1. Therefore, the gap formed between the agitation vessel 102 and the agitation member 104 is wider at the lower portion S2 than at the upper portion S1. In this case, the pressure acting on the material L being agitated between the agitation vessel 102 and the agitation member 104 decreases in the gap S2 formed at the lower portion of the agitation member 104, and the friction acting on the material L lessens. As a result, the generated heat can be kept low in the lower portion of the agitation member 104. On the other hand, the gap S1 formed at the upper portion of the agitation member 104 is narrower than the gap S2 formed at the lower portion of the agitation member 104. Therefore, a required pressure acts in the gap S2, and the material L undergoes a required agitation process.

In this embodiment, at the initial stage of supplying of the material L, the material L is agitated while receiving required pressure and friction in the gap S2, which is formed at the lower portion of the agitation member 104. In this case, the friction that acts on the material L is not so great because the gap S2 is wide. As a result, the heat generation in the location S2 can be kept low. When the viscosity of the material L is high at the initial stage of supplying of the material L, the resistance to the agitation process is high, and accordingly the heat generation also tends to be high. In the agitation apparatus 100, the gap S2 is wide even when the material L has high viscosity at the initial stage of supplying of the material L. For this reason, the resistance that the agitation apparatus 100 receives from the material L is small, so the heat generation in that portion can be kept low.

Moreover, the required agitation effect can be obtained even in such a gap S2, which is formed at the lower portion of the agitation member 104. Therefore, the material L is gradually stirred and the viscosity thereof is decreased to some extent. When the viscosity of the material L decreases, the material L gradually moves toward the upper portion of the agitation member 104 because of the centrifugal force that the material L receives from the agitation member 104. In the agitation apparatus 100, the gap between the agitation vessel 102 and the agitation member 104 is narrower toward the upper portion. Thus, the gap S1, which is formed at the upper portion of the agitation member 104, is narrow, and the pressure acting on the material L is high. Therefore, the required agitation effect can be obtained.

At the upper portion of the agitation member 104, the gap Si between the agitation vessel 102 and the agitation member 104 is narrow. However, in the agitation apparatus 100, the material L that is supplied to the gap S1, which is formed at the upper portion of the agitation member 104 has already been agitated in the gap S2, which is formed at the lower portion, so the viscosity of the material L has already been lowered to some extent. The material L whose viscosity has been lowered to some extent is supplied to the upper portion of the agitation member 104. As a result, the heat generation can be kept low in the gap S1 at the upper portion of the agitation member 104.

Thus, the agitation apparatus 100 can keep the heat generated in the gap between the agitation vessel 102 and the agitation member 104 as a whole to a low level. In addition, the gap S2 between the agitation vessel 102 and the agitation member 104 is wide at the lower portion of the agitation member 104, but the gap S1 between the agitation vessel 102 and the agitation member 104 is narrow at the upper portion of the agitation member 104. This enables the upper portion of the agitation member 104 to carry out a necessary agitation process for the material L.

An appropriate clearance may be set for the gap between the agitation vessel 102 and the agitation member 104. For example, the size of the gap S2, which is formed at the lower portion of the agitation member 104, may be determined as appropriate taking into account the viscosity of the material L to be supplied, the rotation speed (i.e., the number of revolution or the peripheral speed) of the agitation member 104, and so forth so that the heat generation in the portion can be kept low to a certain degree and at the same time a certain degree of agitation effect can be obtained. In addition, the gap S1, which is formed at the upper portion of the agitation member 104, may be determined as appropriate taking into account the viscosity of the material L after the agitation process so that, for example, the agitation apparatus 100 can perform a required agitation process for the material L.

Next, the following shows an example of the comparative test that was conducted in order to verify the advantageous effects of the agitation apparatus in which the gap between the inner circumferential surface of the agitation vessel 102 and the outer circumferential surface of the agitation member 104 is wider at the lower portion of the agitation member 104 than at the upper portion. In the comparative test, the efficiency of the agitation process and the heat generation in the agitation process were compared between the case in which the gap between the inner circumferential surface of the agitation vessel 102 and the outer circumferential surface of the agitation member 104 is wider at the lower portion than the upper portion and the case in which the gap is uniform over the vertical direction.

Figure 2:
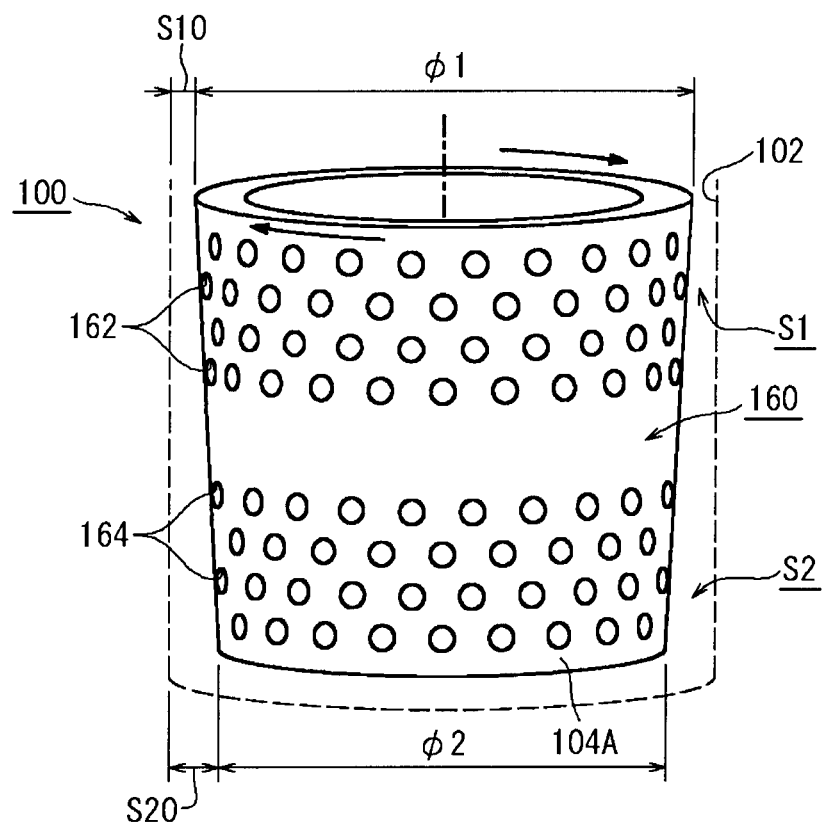
FIG. 2 is a schematic view illustrating an agitation member.
Figure 3:
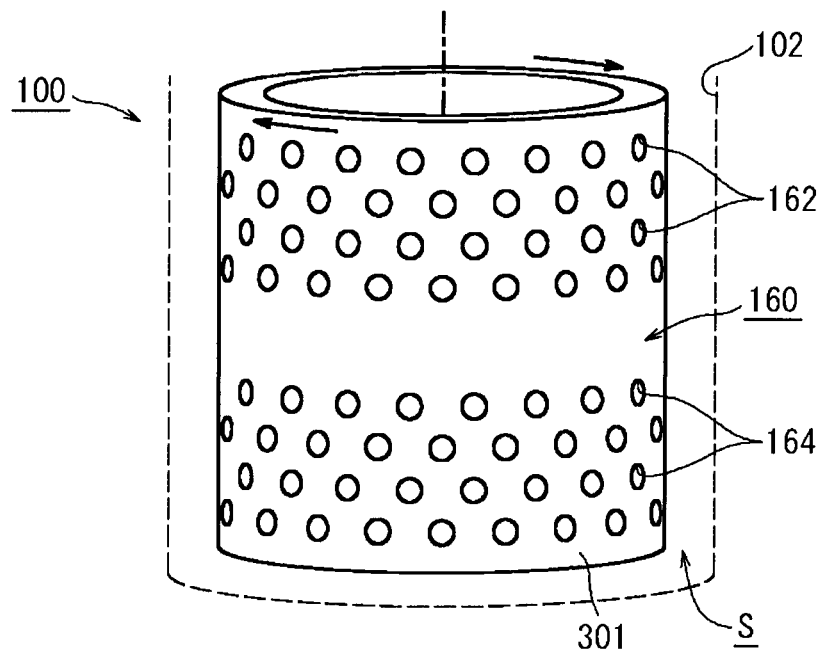
FIG. 3 is a schematic view illustrating an agitation member.
Figure 4:
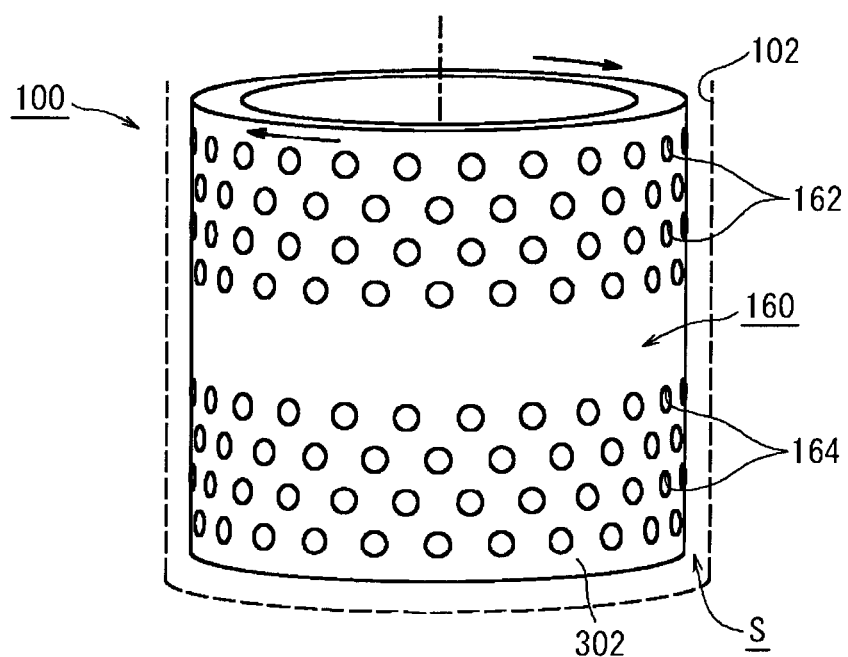
FIG. 4 is a schematic view illustrating an agitation member.

Hereinbelow, an example of the comparative test will be described. FIGS. 2 to 4 schematically show the agitation members 104A, 301, and 302 used in the comparative test, respectively. Here, three agitation members 104A (Example 1), 301 (Comparative Example 1), and 302 (Comparative Example 2) were prepared, as respectively illustrated in FIGS. 2 to 4. All the agitation apparatuses 100 had the same configuration except for the agitation members 104A, 301, and 302. The same material L was supplied thereto and subjected to an agitation process. Herein, the through holes 162 and 164 formed in the agitation members 104A, 301, and 302, for example, were also configured to be the same in shape, size, and number.

Agitation Member 104A

EXAMPLE 1

As illustrated in FIG. 2, an agitation member 104A of Example 1 has a tapered shape such that the outer diameter is gradually narrower from the upper portion toward the lower portion in such a way that the gap S1 at the upper portion from the agitation vessel 102 is 1 mm and the gap S2 at the lower portion from the agitation vessel 102 is 3 mm. In this embodiment, all the through holes 162 and 164 were configured to have a circular shape with a diameter of 3 mm. In this Example 1, the gap between the inner circumferential surface of the agitation vessel 102 and the outer circumferential surface of the agitation member 104A is wider at the lower portion S2 than at the upper portion S1.

Agitation Member 301

COMPARATIVE EXAMPLE 1

As schematically illustrated in FIG. 3, an agitation member 301 of Comparative Example 1 has a cylindrical shape such that the gap S between the agitation vessel 102 and the agitation member 301 is uniformly 3 mm along the vertical direction. In this Comparative Example 1, the gap S between the inner circumferential surface of the agitation vessel 102 and the outer circumferential surface of the agitation member 301 is uniformly wide vertically.

Agitation Member 302

COMPARATIVE EXAMPLE 2

As schematically illustrated in FIG. 4, an agitation member 302 of Comparative Example 2 has a cylindrical shape such that the gap S between the agitation vessel 102 and the agitation member 302 is uniformly 1 mm along the vertical direction. In this Comparative Example 2, the gap S between the inner circumferential surface of the agitation vessel 102 and the outer circumferential surface of the agitation member 302 is uniformly narrow vertically.

<<Material L>>

In the comparative test, the material L used as the sample was a mixture in which a positive electrode active material (such as a lithium-containing oxide), carbon as a conductive agent, and a binder were mixed in a solvent at a predetermined ratio. It should be noted that when the components in the material L and the ratio of the mixture are varied, the viscosity of the material L in an initial supply stage and the viscosity the material L having been subjected to the agitation process viscosity also change. In addition, the temperature of the material L increases due to the agitation process, irrespective of the components of the material L and the content ratio thereof. The tendencies of the data concerning the viscosity of the material L having been subjected to the agitation process and the temperature increase of the material L obtained from the foregoing Example 1, Comparative Example 1, and Comparative Example 2 are almost unvaried, irrespective of the components of the material L and the ratio of the mixture. Here, an example of the test that examines how the efficiency of the agitation process and the temperature increase are affected by the agitation member will be described.

<<Efficiency of Agitation Process>>

Example 1 (see FIG. 2) and Comparative Example 1 (see FIG. 3) were compared to each other about the efficiency of the agitation process. In this case, it was determined how much difference in the viscosity of the material L would occur between Example 1 and Comparative Example 1 when the agitation process was conducted using the agitation members 104A and 301 being rotated at the same number of revolution for the same process time. The number of revolution of the agitation members 104A and 301 was set at 12,565 rpm, and the material L was subjected to the agitation process for 120 seconds. The material L was set aside after the agitation process until the material L became 25° C., and thereafter the viscosity of the material L was measured. The viscosity measurement was conducted using an E-type viscometer (R550 made by Toki Sangyo Co., Ltd.). Here, the cone of the viscometer was rotated at 1 rpm, 20 rpm, and 100 rpm, and the viscosity for each case was measured. The test results are shown in FIG. 5.

Figure 5:
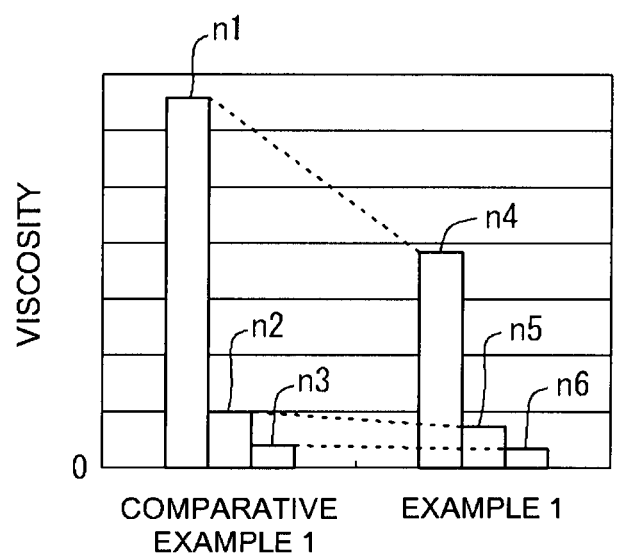
FIG. 5 is a graph illustrating the test results of a comparative test.

As illustrated in FIG. 5, when the cone of the viscometer was rotated at 1 rpm in the measurement, the viscosity n4 of the material L having been subjected to the agitation process according to Example 1 (see FIG. 2) was approximately 0.59, assuming that the viscosity n1 of the material L having been subjected to the agitation process according to Comparative Example 1 (see FIG. 3) was 1.

When the cone of the viscometer was rotated at 20 rpm in the measurement, the viscosity n5 of the material L having been subjected to the agitation process according to Example 1 was approximately 0.75, assuming that the viscosity n2 of the material L having been subjected to the agitation process according to Comparative Example 1 was 1.

When the cone of the viscometer was rotated at 100 rpm in the measurement, the viscosity n6 of the material L having been subjected to the agitation process according to Example 1 was approximately 0.88, assuming that the viscosity n3 of the material L having been subjected to the agitation process according to Comparative Example 1 was 1.

Thus, the viscosity of the material L tends to be lower when the agitation process is carried out according to Example 1 (see FIG. 2) than when the agitation process is carried out according to Comparative Example 1 (see FIG. 3). In order to obtain the same degree of viscosity that can be obtained when using the agitation member 104A of Example 1 by using the agitation member 301 of Comparative Example 1, it is necessary to make the process time longer than when using the agitation member 104A of Example 1. Thus, the efficiency of the agitation process is higher when the gap between the agitation vessel 102 and the agitation member 104A is wider at the lower portion S2 than at the upper portion S1 (see FIG. 2: Example 1) than when the gap S between the agitation vessel 102 and the agitation member 301 is uniformly wide over the vertical direction (see FIG. 3: Comparative Example 1).

<<Heat Generation>>

Next, Example 1 (see FIG. 2) and Comparative Example 2 (see FIG. 4) were compared to each other about heat generation. In this case, it was determined how much difference in temperature increase of the material L would occur between Example 1 and Comparative Example 2 when the agitation process was conducted for the same process time with the agitation members 104A and 302 being rotated at the same number of revolution. Here, the number of revolution of the agitation members 104A and 302 was set at 12,565 rpm, and the material L was subjected to the agitation process for 120 seconds. The test results are shown in FIG. 6.

Figure 6:
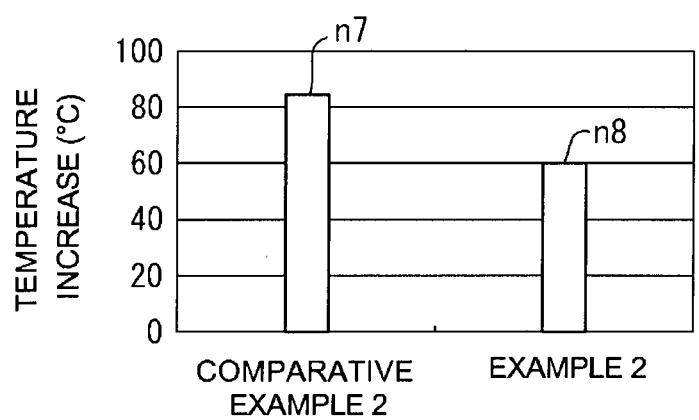
FIG. 6 is a graph illustrating the test results of a comparative test.

As illustrated in FIG. 6, in Comparative Example 2 (see FIG. 4), the temperature increase n7 (the temperature difference before and after the agitation process) of the material L having been subjected to the agitation process was 80.7° C. In contrast, in Example 1 (see FIG. 2), the temperature increase n8 of the material L having been subjected to the agitation process was 60° C. Thus, Example 1 (see FIG. 2) shows a less temperature increase of the material L having been subjected to the agitation process than Comparative Example 2 (see FIG. 4). In addition, in order to lessen the temperature increase in Comparative Example 2 (see FIG. 4) to almost the same level to that in Example 1 (see FIG. 2), it is necessary that the peripheral speed of the agitation member 302 be made slower in the agitation process.

Moreover, when the peripheral speed of the agitation member 302 is set slow in Comparative Example 2 (see FIG. 4), it is necessary that the process time be made longer in order to obtain the required viscosity of the material L. Thus, the balance between the efficiency of the agitation process for the material L and the lessening of the heat generation in the agitation process was better in the case that the gap between the agitation vessel 102 and the agitation member 104A is wider at the lower portion S2 than at the upper portion S1 (see FIG. 2: Example 1) than in the case that the gap S between the agitation vessel 102 and the agitation member 302 is uniformly narrow along the vertical direction (see FIG. 4: Comparative Example 2).

It should be noted that the data shown in FIGS. 5 and 6 can vary depending on the conditions such as the components and amount of the material L, and the specific shapes and sizes of the agitation member and the agitation vessel. However, almost the same tendency can be found both when using the agitation member 301 or 302 such that the gap S from the agitation vessel 102 is uniform over the vertical direction (see FIGS. 3 and 4) and when using the agitation member 104A such that the gap from the agitation vessel 102 is wider at the lower portion S2 than the upper portion S1 (see FIG. 2).

As described above, Example 1 (see FIG. 2), which uses the agitation member 104A such that the gap from the agitation vessel 102 is wider at the lower portion than at the upper portion, can ensure required process efficiency while keeping the heat generation low. Thus, by setting the gap between the inner circumferential surface of the agitation vessel and the outer circumferential surface of the agitation member to be wider at the lower portion of the agitation member than at the upper portion thereof, required process efficiency can be ensured while keeping the heat generation low. In the embodiments shown in FIGS. 1 and 2, the outer diameter φ2 of the lower portion is made smaller than the outer diameter φ1 of the upper portion in the agitation members 104 and 104A, but such a structure is not necessarily essential.

When the gap between the agitation vessel 102 and the agitation member 104A is wider at the lower portion S2 than the upper portion S1, it is desirable that the ratio (S10/S20) between the gap S10 between the agitation vessel 102 and the agitation member 104A at the upper end of the agitation member 104A and the gap S20 between the agitation vessel 102 and the agitation member 104A at the lower end of the agitation member 104A should be equal to or less than 0.95, [0.95≥(S10/S20)], more preferably equal to or less than 0.8 [0.8≥(S10/S20)], as illustrated in FIG. 2. Thereby, the required difference of the gap between the agitation vessel 102 and the agitation member 104A is created at the upper portion and the lower portion of the agitation member 104A. As a result, it is expected to obtain the effect of ensuring required process efficiency while keeping the heat generation low, in comparison with the case where the gap between the agitation vessel 102 and the agitation member 104A is uniform.

Figure 7:
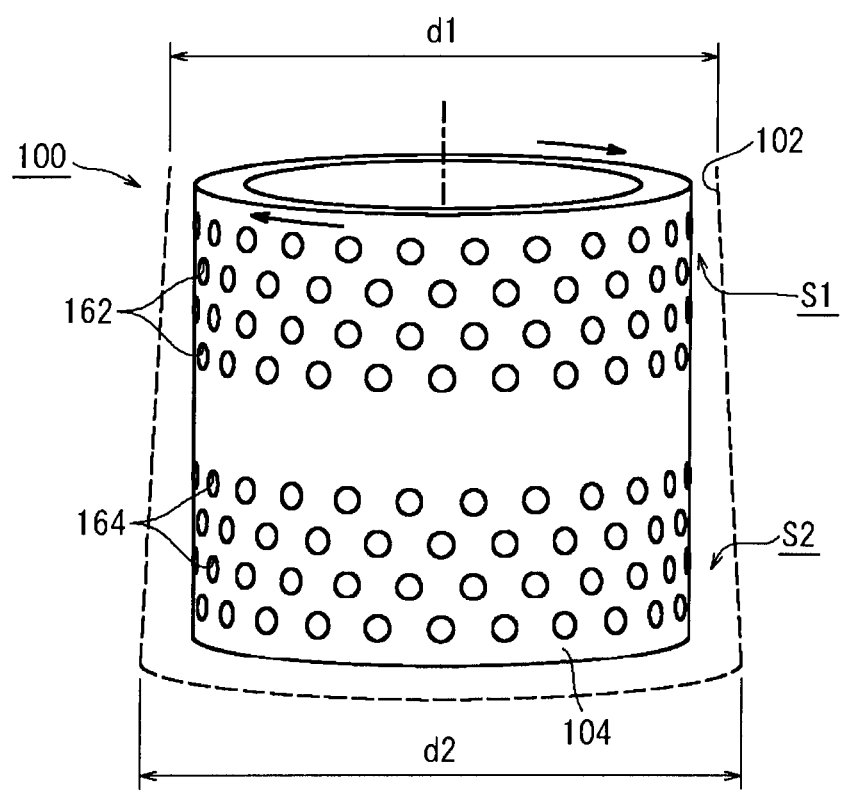
FIG. 7 is a schematic view illustrating an agitation member.
Figure 8:
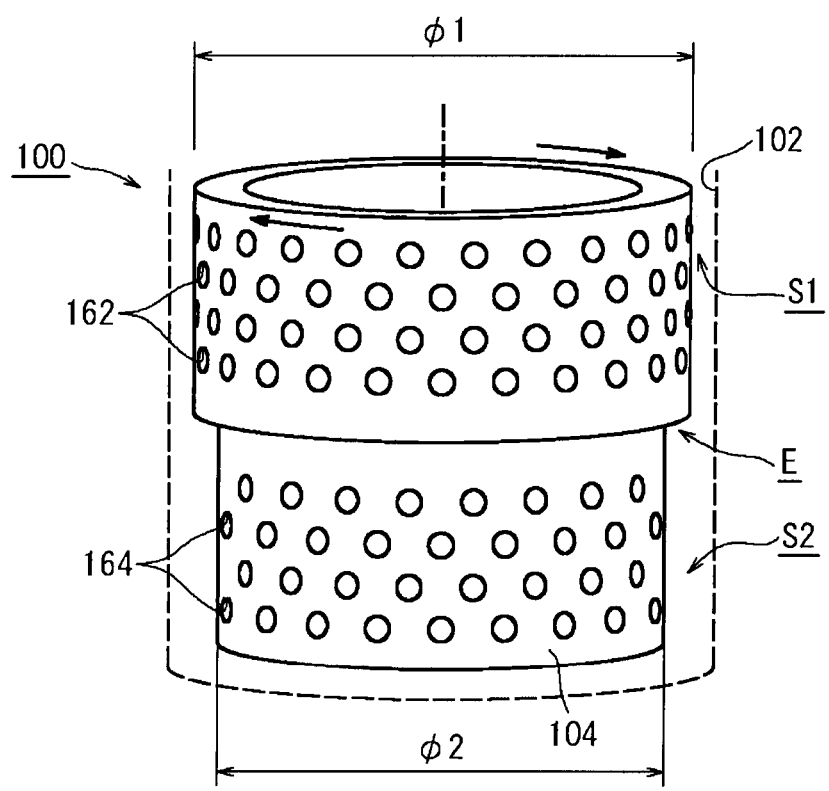
FIG. 8 is a schematic view illustrating an agitation member.

FIGS. 7 and 8 schematically show modified examples of the agitation apparatus 100. For example, the agitation apparatus 100 may have an agitation vessel 102, for example, having an inner diameter thereof that is greater at the lower portion d2 than at the upper portion d1, as illustrated in FIG. 7, so that the gap between the agitation vessel 102 and the agitation member 104 is wider at the lower portion S2 than at the upper portion S1. On the other hand, FIG. 1 illustrates an example of the agitation member 104 that has a tapered shape such that the outer diameter is gradually narrower from the upper portion toward the lower portion. With such an agitation member 104, the gap between the agitation vessel 102 and the agitation member 104 can be varied gradually along the vertical direction, and the agitation effect working on the material L can be varied gradually between the upper portion and the lower portion of the agitation member 104.

Thereby, the material L can be agitated gradually. It should be noted that the agitation member does not necessarily have such a tapered shape in the case where the gap between the inner circumferential surface of the agitation vessel 102 and the outer circumferential surface of the agitation member 104 is wider at the lower portion S2 of the agitation member 104 than at the upper portion S1 thereof. For example, as illustrated in FIG. 8, a step E may be formed at the vertically mid-portion of the outer circumferential surface of the agitation member 104 so that the outer diameter φ2 of the lower portion is smaller than the outer diameter φ1 of the upper portion of the agitation member 104, whereby the gap between the agitation vessel 102 and the agitation member 104 is configured such that the gap S2 at the lower portion is wider than the gap S1 at the upper portion.

The method of ensuring required process efficiency while keeping the heat generation low is not limited to the embodiment of setting the gap between the inner circumferential surface of the agitation vessel and the outer circumferential surface of the agitation member to be wider at the lower portion of the agitation member than at the upper portion thereof. It is possible that, for example, the gap between the inner circumferential surface of the agitation vessel 102 and the outer circumferential surface of the agitation member 104 may be partially varied along a vertical direction of the agitation member 104. Other embodiments will be described in the following.

Figure 9:
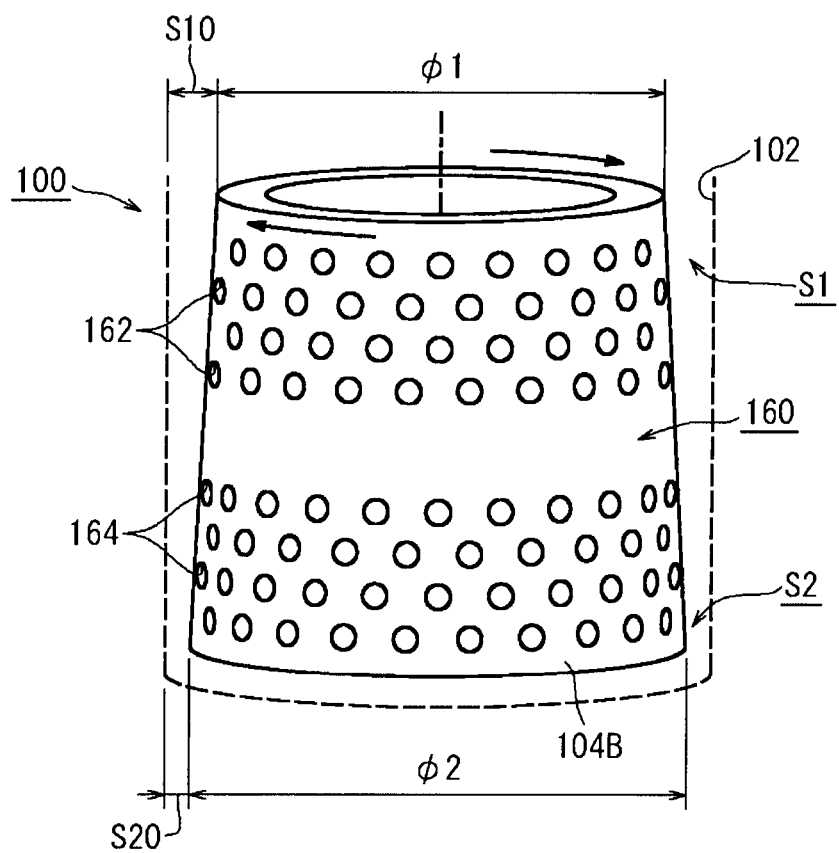
FIG. 9 is a schematic view illustrating an agitation member.

For example, FIG. 9 shows an embodiment in which the gap between the inner circumferential surface of the agitation vessel 102 and the outer circumferential surface of the agitation member 104B wider at the upper portion S1 of the agitation member 104B than at the lower portion S2 thereof. In this case, the gap S2 between the agitation vessel 102 and the agitation member 104B is narrow at the lower portion of the agitation member 104B. Therefore, the pressure acting on the material L can be raised at that location S2, so required agitation can be performed for the material L. On the other hand, the gap S1 between the agitation vessel 102 and the agitation member 104B is wide at the upper portion of the agitation member 104B, so the pressure acting on the material L is kept low at that location. As a result, the friction caused to the material L can be lessened, and the heat generation can be kept low. Moreover, the material L can be prevented from undergoing an excessive agitation process.

The following shows an example of the comparative test that was conducted in order to verify the advantageous effects of the agitation apparatus as shown in FIG. 9, in which the gap between the inner circumferential surface of the agitation vessel 102 and the outer circumferential surface of the agitation member 104B is wider at the upper portion S1 of the agitation member 104B than at the lower portion S2 thereof In the comparative test, the efficiency of the agitation process and the heat generation in the agitation process were compared between the case (Example 2: see FIG. 9) in which the gap between the inner circumferential surface of the agitation vessel 102 and the outer circumferential surface of the agitation member 104B is wider at the upper portion S1 than the lower portion S2 and the cases (Comparative Example 1: see FIG. 3, Comparative Example 2: see FIG. 4) in which the gap is uniform over the vertical direction.

Hereinbelow, an example of the comparative test will be described. FIGS. 3, 4, and 9 schematically show the agitation members 301, 302, and 104B used in the comparative test, respectively. Here, three agitation members 301, 302, and 104B were prepared, as respectively illustrated in FIGS. 3, 4, and 9. All the agitation apparatuses 100 had the same configuration except for the agitation members 301, 302, and 104B. The same material L was supplied thereto and subjected to an agitation process. Herein, for example, the through holes 162 and 164 formed in the agitation members 301, 302, and 104B were also configured to be the same in shape, size, and number.

Agitation Member 104B

EXAMPLE 2

As illustrated in FIG. 9, the agitation member 104B of Example 2 has a tapered shape such that the outer diameter is gradually greater from the upper portion toward the lower portion in such a way that the gap S1 at the upper portion from the agitation vessel 102 is 3 mm and the gap S2 at the lower portion from the agitation vessel 102 is 1 mm. In this Example 2, the gap between the inner circumferential surface of the agitation vessel 102 and the outer circumferential surface of the agitation member 104B is wider at the upper portion S1 than at the lower portion S2. Comparative Example 1 (see FIG. 3), Comparative Example 2 (see FIG. 4), and the material L are as already described above, and will not be further elaborated upon herein.

<<Efficiency of Agitation Process>>

Figure 10:
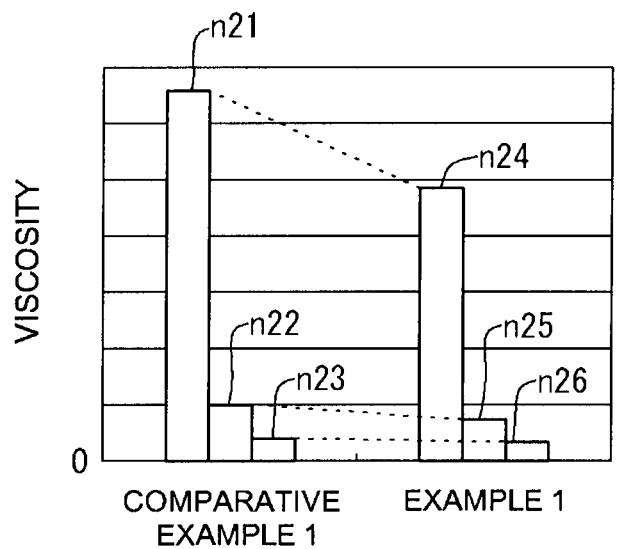
FIG. 10 is a graph illustrating the test results of a comparative test.

Example 2 (see FIG. 9) and Comparative Example 1 (see FIG. 3) were compared to each other about the efficiency of the agitation process. In this case, it was determined how much difference in the viscosity of the material L would occur between Example 2 and Comparative Example 1 when the agitation process was conducted using the agitation members 104B and 301 being rotated at the same number of revolution for the same process time. Here, the number of revolution of the agitation members 104B and 301 was set at 10052 rpm, and the material L was subjected to an agitation process for 120 seconds. The test results in this case are shown in FIG. 10. The material L was set aside after the agitation process until the material L became 25° C., and thereafter the viscosity of the material L was measured. The viscosity measurement was conducted using an E-type viscometer (R550 made by Toki Sangyo Co., Ltd.). Here, the cone of the viscometer was rotated at 1 rpm, 20 rpm, and 100 rpm, and the viscosity for each case was measured. The test results are shown in FIG. 10.

As illustrated in FIG. 10, when the cone of the viscometer was rotated at 1 rpm in the measurement, the viscosity n24 of the material L having been subjected to the agitation process according to Example 2 (see FIG. 9) was approximately 0.60, assuming that the viscosity n21 of the material L having been subjected to the agitation process according to Comparative Example 1 (see FIG. 3) was 1.

When the cone of the viscometer was rotated at 20 rpm in the measurement, the viscosity n25 of the material L having been subjected to the agitation process according to Example 2 was approximately 0.74, assuming that the viscosity n22 of the material L having been subjected to the agitation process according to Comparative Example 1 was 1.

When the cone of the viscometer was rotated at 100 rpm in the measurement, the viscosity n26 of the material L having been subjected to the agitation process according to Example 2 was approximately 0.87, assuming that the viscosity n23 of the material L having been subjected to the agitation process according to Comparative Example 1 was 1.

Thus, the viscosity of the material L tends to be lower when the agitation process is carried out according to Example 2 (see FIG. 9) than when the agitation process is carried out according to Comparative Example 1 (see FIG. 3). In addition, in order to obtain the same degree of viscosity that can be obtained when using the agitation member 104B of Example 2 by using the agitation member 301 of Comparative Example 2, it is necessary to make the process time even longer. Thus, the efficiency of the agitation process is higher when the gap between the agitation vessel 102 and the agitation member 104B is wider at the upper portion S1 than at the lower portion S2 (see FIG. 9: Example 2) than when the gap between the agitation vessel 102 and the agitation member 301 is uniformly wide over the vertical direction (see FIG. 3: Comparative Example 1).

<<Heat Generation>>

Next, Example 2 (see FIG. 9) and Comparative Example 2 (see FIG. 4) were compared to each other about heat generation. In this case, it was determined how much difference in temperature increase of the material L would occur between Example 2 and Comparative Example 2 when the agitation process was conducted for the same process time with the agitation members 104B and 302 being rotated at the same number of revolution. Here, the number of revolution of the agitation members 104B and 302 was set at 10052 rpm, and the material L was subjected to the agitation process for 120 seconds. The test results are shown in FIG. 11.

Figure 11:
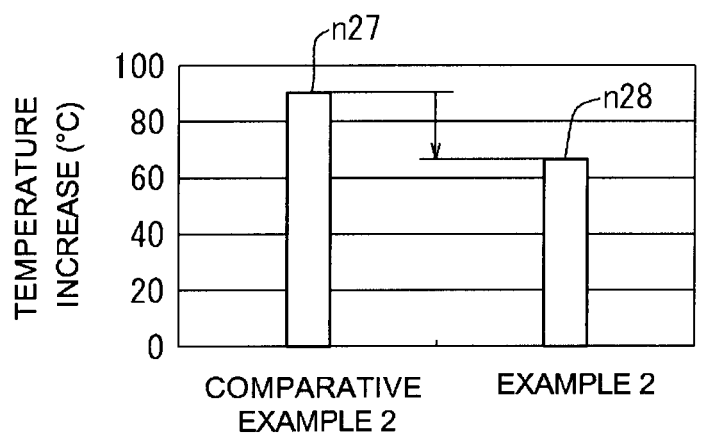
FIG. 11 is a graph illustrating the test results of a comparative test.

As illustrated in FIG. 11, in Comparative Example 2 (see FIG. 4), the temperature increase n27 (the temperature difference before and after the agitation process) of the material L having been subjected to the agitation process was 80.5° C. In contrast, in Example 2 (see FIG. 9), the temperature increase n8 of the material L having been subjected to the agitation process was 59° C. Thus, Example 2 (see FIG. 9) shows a less temperature increase of the material L having been subjected to the agitation process than Comparative Example 2 (see FIG. 4). Thus, Comparative Example 2 (see FIG. 4) tends to show higher heat generation because the gap S between the agitation vessel 102 and the agitation member 302 is uniformly narrow over the vertical direction. In contrast, the balance between the efficiency of the agitation process and the effect of suppressing the heat generation of the material L was found to be good in the case that the gap between the inner circumferential surface of the agitation vessel 102 and the outer circumferential surface of the agitation member 104B is wider at the upper portion S1 than the lower portion S2 (see FIG. 9: Example 2).

When the gap between the agitation vessel 102 and the agitation member 104B is wider at the upper portion S1 than at the lower portion S2, it is desirable that the ratio (S10/S20) between the gap S10 between the agitation vessel 102 and the agitation member 104B at the upper end of the agitation member 104B and the gap S20 between the agitation vessel 102 and the agitation member 104B at the lower end of the agitation member 104B should be equal to or greater than 1.05, [1.05≤(S10/S20)], more preferably equal to or greater than 1.2 [1.2≤(S10/S20)], as illustrated in FIG. 9. Thereby, the required difference of the gap between the agitation vessel 102 and the agitation member 104B is created at the upper portion and the lower portion of the agitation member 104B. As a result, it is expected to obtain the effect of attaining a good balance between the efficiency of the agitation process for the material L and the effect of suppressing the heat generation, in comparison with the case where the gap between the agitation vessel 102 and the agitation member 104B is uniform.

It should be noted that the data shown in FIGS. 10 and 11 can vary depending on the conditions such as the components and amount of the material L, and the specific shapes and sizes of the agitation member and the agitation vessel. However, almost the same tendency can be found both when using the agitation member 301 or 302 such that the gap S from the agitation vessel 102 is uniform over the vertical direction (see FIGS. 3 and 4) and when using the agitation member 104A such that the gap from the agitation vessel 102 is wider at the upper portion S1 than at the lower portion S2 (see FIG. 9).

As described above, the agitation apparatus 100 in which the gap between the inner circumferential surface of the agitation vessel 102 and the outer circumferential surface of the agitation member 104 is partially varied along a vertical direction of the agitation member 104, as illustrated in FIG. 1, makes it possible to perform the required agitation process at high efficiency while keeping the heat generation low, for example.

In this case, as illustrated in FIG. 2, the gap between the inner circumferential surface of the agitation vessel 102 and the outer circumferential surface of the agitation member 104A may be wider at the lower portion S2 than at the upper portion S1 of agitation member 104A. On the other hand, as illustrated in FIG. 9, the gap between the inner circumferential surface of the agitation vessel 102 and the outer circumferential surface of the agitation member 104B may be made wider at the upper portion S1 than at the lower portion S2 of agitation member 104A (see FIG. 9). As an example of the structure in which the gap between the inner circumferential surface of the agitation vessel 102 and the outer circumferential surface of the agitation member 104 is partially varied along a vertical direction of the agitation member 104, it is possible that the outer diameter ϕ2 of the lower portion of the agitation member 104A may be made smaller than the outer diameter ϕ1 of the upper portion of the agitation member 104A. Conversely, as illustrated in FIG. 9, the outer diameter ϕ1 of the upper portion of the agitation member 104B may be made smaller than the outer diameter ϕ2 of the lower portion of the agitation member 104.

Another example of the structure in which the gap between the inner circumferential surface of the agitation vessel 102 and the outer circumferential surface of the agitation member 104 is partially varied along a vertical direction of the agitation member 104 may be such that, as illustrated in FIG. 7, the inner diameter of the agitation vessel 102 may be varied between the upper portion and the lower portion. Alternatively, as illustrated in FIG. 8, the step E is provided at the vertically mid-portion in the outer circumferential surface of the agitation member 104 so that the upper portion and the lower portion of the agitation member 104 have different outer diameters. Alternatively, although not shown in the drawings, a step may be provided at the vertically mid-portion of the agitation vessel 102 in the inner circumferential surface of the agitation vessel 102 so that the upper portion and the lower portion of the agitation vessel 102 have different inner diameters. In these manners, the gap between the inner circumferential surface of the agitation vessel 102 and the outer circumferential surface of the agitation member 104 can be made partially varied along a vertical direction of the agitation member 104.

In the embodiments shown in FIGS. 2 and 9, the gap between the inner circumferential surface of the agitation vessel 102 and the outer circumferential surface of the agitation member 104 is gradually wider or narrower along a vertical direction of the agitation member 104. As described above, setting the gap between the inner circumferential surface of the agitation vessel 102 and the outer circumferential surface of the agitation member 104 to be wider serves to lessen the pressure acting on the material L while keeping the heat generation low, and at the same time to alleviate the agitation effect. On the other hand, setting the gap between the inner circumferential surface of the agitation vessel 102 and the outer circumferential surface of the agitation member 104 to be narrower serves to increase the effect of lessening the pressure acting on the material L and to enhance the agitation effect.

For these reasons, the gap between the inner circumferential surface of the agitation vessel 102 and the outer circumferential surface of the agitation member 104 may be widened or narrowed at an appropriate position. For example, although not shown in the drawings, it is possible to widen the gap between the inner circumferential surface of the agitation vessel 102 and the outer circumferential surface of the agitation member 104 at a vertically mid-portion of the agitation member 104 and to make the gap at vertical end portions of the agitation member 104 narrower than at the mid-portion. Thereby, the pressure acting on the material L can be lessened and the heat generation can be kept low at the mid-portion of the agitation member 104, and at the same time, the pressure acting on the material L can be raised and the agitation effect can be enhanced at the vertical end portions of the agitation member 104.

Alternatively, although not shown in the drawings, it is possible to widen the gap between the inner circumferential surface of the agitation vessel 102 and the outer circumferential surface of the agitation member 104 at vertical end portions of the agitation member 104 and to make the gap narrower at a mid-portion of the agitation member 104 than at the vertical end portions. Thereby, the pressure acting on the material L can be raised and the agitation effect can be enhanced at the mid-portion of the agitation member 104, and at the same time, the pressure acting on the material L can be lessened while keeping the heat generation low and the agitation effect can be alleviated at the vertically end portions of the agitation member 104. Thus, the gap between the inner circumferential surface of the agitation vessel 102 and the outer circumferential surface of the agitation member 104 may be made wider or narrower at an appropriate vertical position of the agitation member 104, depending on the desired agitation process for the material L.

As illustrated in FIGS. 2 and 9, a plurality of through holes 162 and 164 penetrating through the agitation member in radial directions are formed in each of the agitation members 104A and 104B. The agitation apparatus 100 can perform a required agitation process efficiently while keeping heat generation low, by partially varying the gap between the inner circumferential surface of the agitation vessel 102 and the outer circumferential surface of the agitation member 104 along a vertical direction of the agitation member 104. In addition to this, the through holes 162 formed in the lower portion of each of the agitation members 104A and 104B may be made larger than the through holes 164 formed in the upper portion thereof. Thereby, the heat generation can be kept low in the agitation apparatus 100 as a whole, and at the same time, the process efficiency can be improved. Such an agitation apparatus 100 will be described in the following.

Figure 12:
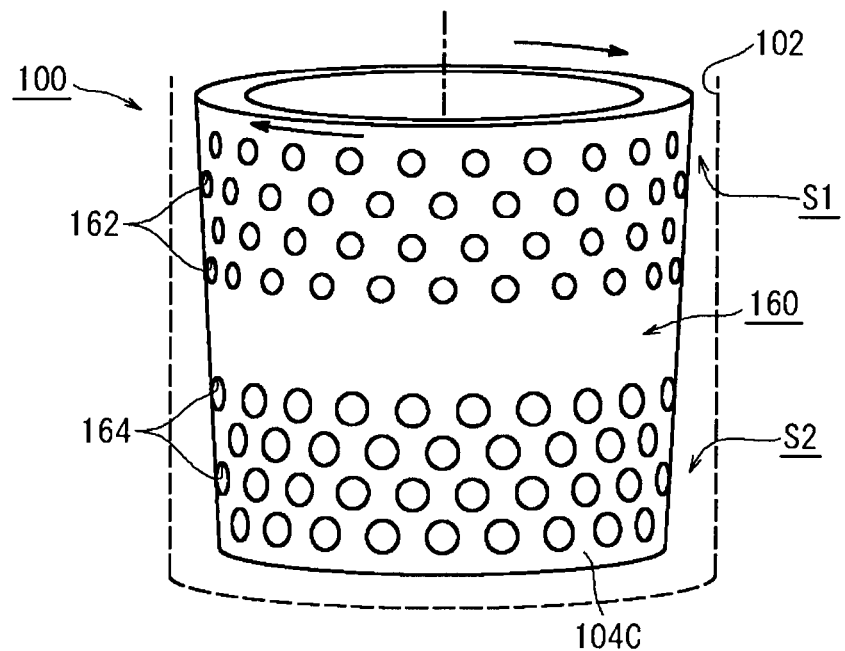
FIG. 12 is a schematic view illustrating an agitation member.

FIG. 12 is a schematic view of an agitation apparatus 100 having an agitation member 104C in which the through holes 164 formed in the lower portion are made larger than the through holes 162 formed in the upper portion. The agitation apparatus 100 shown in FIG. 12 has the same configuration as the agitation apparatus 100 shown in FIG. 1, except for the size of the through holes 162 and 164 (particularly the through holes 164 in the lower portion) formed in the agitation member 104C. In the agitation apparatus 104C, the through holes 164 formed in the lower portion are larger than the through holes 162 formed in the upper portion. In this embodiment, in the agitation member 104, the through holes 164 formed in the lower portion are made larger than the through holes formed in the upper portion, marking the boundary at the axially mid-portion 160 of the cylindrical portion 152 from which the arm portion 154 extends.

It is recommended that the sizes of the through holes 162 and 164 may be determined as appropriate taking into account, for example, the viscosity and particle size of the material L supplied to the agitation vessel 102 at the initial stage. In this embodiment, the size of the through holes 164 formed in the lower portion is set at a size such that even the material L in the initial supply stage with a high viscosity can pass therethrough. On the other hand, the size of the through holes 162 formed in the upper portion is set at a size such that the material L in the initial supply stage with a high viscosity cannot easily pass therethrough but the material L that has been agitated to some extent and whose viscosity has been lowered can pass therethrough.

In this embodiment, the plurality of through holes 162 formed in the upper portion are formed to be the same size, and so are the plurality of through holes 164 formed in the lower portion. Specifically, in this embodiment, the through holes 162 formed in the upper portion of the agitation member 104 are circular shaped holes having a diameter of 3 mm, and the through holes 164 formed in the lower portion thereof are circular shaped holes having a diameter of 5 mm. Thus, in this embodiment, the through holes 162 formed in the upper portion of the agitation member 104 are uniformly made smaller than the through holes 164 formed in the lower portion of the agitation member 104.

In the agitation apparatus 100, the through holes 164 formed in the lower portion of the agitation member 104 are circular shaped holes having a diameter of b 5 mm. In this embodiment, the through holes 164 formed in the lower portion are set at a size such that the material L in an initial supply stage with a high viscosity can pass therethrough. The through holes 162 formed in the upper portion of the agitation member 104 are circular shaped holes having a diameter of 3 mm. In this embodiment, the through holes 162 formed in the upper portion are set at a size such that the material L in the initial supply stage with a high viscosity cannot easily pass therethrough but the material L that has been agitated to some extent and whose viscosity has been lowered can pass therethrough.

In that case, the material L in the initial supply stage with a high viscosity is processed in the lower portion of the agitation vessel 102. On the other hand, the material L that has been agitated to some extent and whose viscosity has been lowered receives the action of the centrifugal force and moves toward the upper portion of the agitation member 104. In this way, the material L that has been agitated to some extent in the lower portion of the agitation vessel 102 and whose viscosity has been lowered from that in the initial supply stage tends to be supplied to the upper portion of the agitation member 104. The material L whose viscosity has been lowered than that in the initial supply stage passes through the through holes 162 formed in the upper portion of the agitation member 104, and is supplied to the gap between the agitation vessel 102 and the agitation member 104. Thus, the material L having a high viscosity in an initial supply stage is processed in the lower portion of the agitation member 104. On the other hand, the material L that has been agitated to some extent and whose viscosity has been lowered is processed in the upper portion of the agitation member 104.

In this case, although the heat generation is high in the lower portion of the agitation vessel 102, which processes the material L with a high viscosity, the heat generation is kept low in the upper portion of the agitation member 102 (the upper portion of the lower case 102b in this embodiment), which processes the material L whose viscosity has been lowered. As a result, the heat generation can be kept low in the agitation apparatus as a whole. Moreover, in the lower portion of the agitation vessel 102, the through holes 164 are made larger so that the material L can be supplied easily to the gap between the agitation vessel 102 and the agitation member 104. Therefore, even when the material L with a high viscosity is supplied thereto, the process efficiency can be prevented from decreasing. Thus, the agitation apparatus 100 can keep the heat generation low as a whole and at the same time prevent the process efficiency from decreasing.

Figure 13:
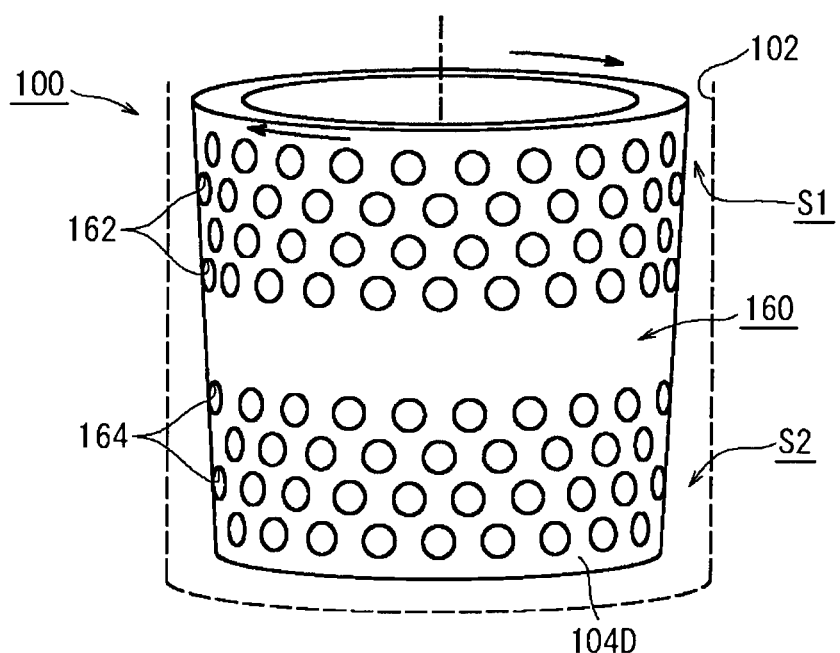
FIG. 13 is a schematic view illustrating an agitation member.

The present inventors prepared a plurality of agitation members having different through holes for such an agitation apparatus 100 and carried out an agitation process for the same material L under the same conditions, to measure the temperature increase of the material L after the process and the viscosity of the material L after the process. In an example of the comparative test, the present inventors prepared an agitation member 106C in which, as shown in FIG. 12, circular shaped through holes 162 having a diameter of 3 mm were formed in the upper portion and circular shaped through holes 164 having a diameter of 5 mm were formed in the lower portion (Example 3). For purposes of comparison with this example, the inventors also prepared an agitation member 104A (Example 1) as shown in FIG. 2, in which all the through holes 162 and 164 were formed to be circular shaped through holes having a diameter of 3 mm, as well as an agitation member 104D (Example 4) as shown in FIG. 13, in which all the through holes 162 and 164 are formed to be circular shaped through holes having a diameter of 5 mm. Herein, the configurations of the agitation members 104A, 104C, and 104D were configured to be the same except for the shapes and sizes of the through holes 162 and 164 formed in each of the agitation members 104A, 104C, and 104D.

<<Heat Generation>>

In the comparative test for comparing heat generation, the material L was supplied at a predetermined amount to each of the three agitation vessels 102 to which the agitation members 104C (see FIG. 12: Example 3), 104A (see FIG. 2: Example 1), and to 104D (see FIG. 13: Example 4) were fitted respectively. Then, the agitation members 104C, 104A, and 104D were rotated at a predetermined rotation speed for a predetermined time to perform an agitation process, and after the process, the temperature increase of the material L was measured for each example. The results are shown in FIG. 14.

Figure 14:
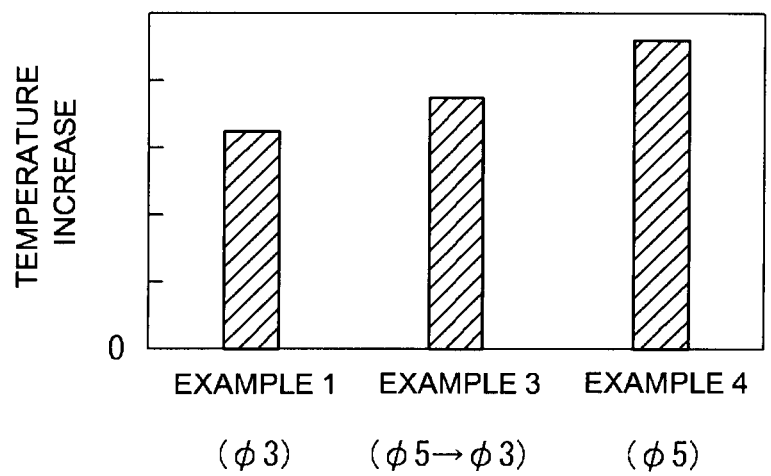
FIG. 14 is a graph illustrating the test results of a comparative test.

As shown in FIG. 14, when all the through holes 162 and 164 were formed in a circular shape having a diameter of 3 mm (i.e., the agitation member 104A, see FIG. 2: Example 1), the temperature increase of the material L was lowest. When the circular shaped through holes 162 having a diameter of 3 mm were formed in the upper portion and the circular shaped through holes 164 having a diameter of 5 mm were formed in the lower portion (i.e., the agitation member 104 C, see FIG. 12: Example 3), the temperature increase of the material L was slightly higher than Example 1. When all the through holes 162 and 164 were formed in a circular shape having a diameter of 5 mm (i.e., the agitation member 104D, see FIG. 13: Example 4), the temperature increase of the material L was highest.

<<Efficiency of Agitation Process>>

Figure 15:
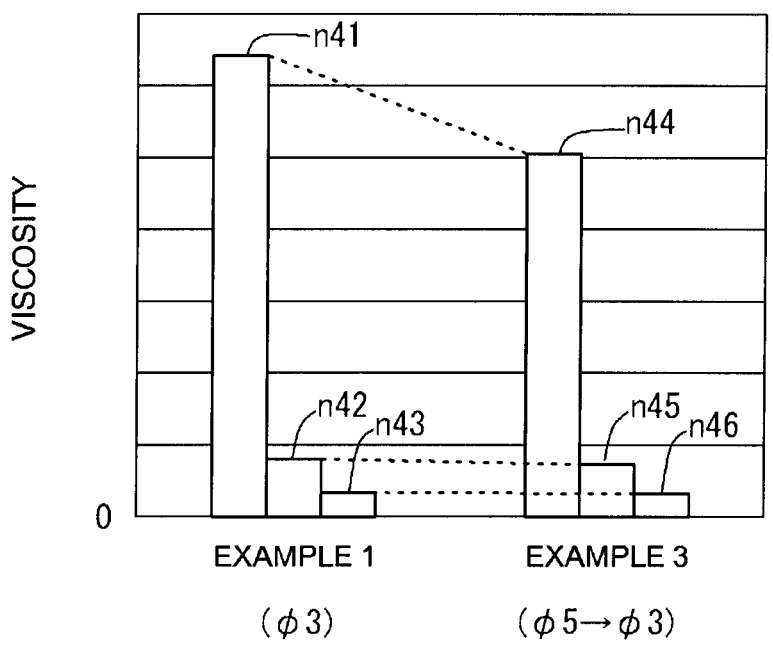
FIG. 15 is a graph illustrating the test results of a comparative test.

The efficiency of the agitation process was compared between the case in which all the through holes 162 and 164 were formed to have a circular shape with a diameter of 3 mm (i.e., the agitation member 104A, see FIG. 2: Example 1) and the case in which the circular shaped through holes 162 having a diameter of 3 mm were formed in the upper portion while the circular shaped through holes 164 having a diameter of 5 mm were formed in the lower portion (i.e., the agitation member 104C, see FIG. 12: Example 3). In Examples 1 and 3, the agitation process was conducted using the agitation members 104A and 104C being rotated at the same number of revolution for the same process time. Then, it was determined how much difference in the viscosity of the material L would occur. Here, after the agitation process, the material L was set aside until the material L became 25° C., and thereafter the viscosity of the material L was measured. The viscosity measurement was conducted using an E-type viscometer (R550 made by Toki Sangyo Co., Ltd.). Here, the cone of the viscometer was rotated at 1 rpm, 20 rpm, and 100 rpm, and the viscosity for each case was measured. The test results are shown in FIG. 15. As shown in FIG. 15, the results indicate that, with the same number of revolution and the same process time, the viscosity was lower when using the agitation member 104C than when using the agitation member 104A (see FIG. 2).

As illustrated in FIG. 15, when the cone of the viscometer was rotated at 1 rpm in the measurement, the viscosity of the material L having been subjected to the agitation process according to Example 1 (see FIG. 2) was n41, and the viscosity of the material L having been subjected to the agitation process according to Example 3 (see FIG. 12) was n44.

When the cone of the viscometer was rotated at 20 rpm in the measurement, the viscosity of the material L having been subjected to the agitation process according to Example 1 was n42, and the viscosity of the material L having been subjected to the agitation process according to Example 3 was n45.

When the cone of the viscometer was rotated at 100 rpm in the measurement, the viscosity of the material L having been subjected to the agitation process according to Example 1 was n43, and the viscosity of the material L having been subjected to the agitation process according to Example 3 was n46.

As can be seen from the test results, the viscosity is lower and the efficiency of the agitation process is better in the case in which the through holes 162 in the upper portion are in a 3-mm diameter circular shape and the through holes 164 in the lower portion are in a 5-mm diameter circular shape (Example 3) than in the case in which all the through holes 162 and 164 are in a 3-mm diameter circular shape (Example 1). Thus, a good balance between the efficiency of the agitation process for the material L and the suppressing of the heat generation in the agitation process can be achieved by making the through holes 164 formed in the lower portion of the agitation member 104 larger than the through holes 162 formed in the upper portion thereof.

As illustrated in FIG. 12, the agitation member 104C has a boundary at the axially mid-portion 160 (see FIG. 1) from which the arm portion 154 extends, and the through holes 164 formed in the lower portion below the mid-portion 160 are larger than the through holes 162 formed in the upper portion. The boundary at which the sizes of the through holes 162 and 164 formed in the agitation member 104 are changed may not be set at the axially mid-portion 160 from which the arm portion 154 extends.

In the agitation member 104C shown in FIG. 12, the through holes 164 formed in the lower portion are uniformly larger than the through holes 162 formed in the upper portion. The sizes of the through holes 162 and 164 formed in the agitation member are not limited to such a configuration. For example, although not shown in the drawings, it is possible to form through holes such that the sizes thereof become larger gradually, or step by step, from the upper portion toward the lower portion of the agitation member. In another embodiment, although the through holes formed in the agitation member have a circular shape in the foregoing embodiment, the shape of the through holes may not be a circular shape. For example, the through holes may have various geometric shapes including: quadrangular shapes, such as square, parallelogram, rectangle, and trapezoid; triangular shapes; other polygonal shapes; and elliptic shapes, or may have irregular shapes.

Figure 16:
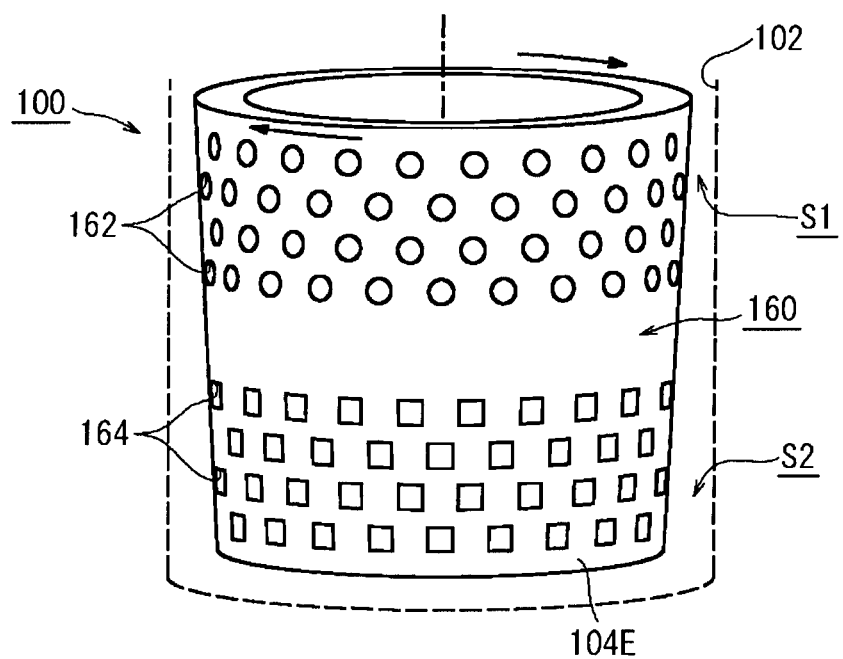
FIG. 16 is a schematic view illustrating an agitation member.

For example, in an agitation member 104E shown in FIG. 16, the through holes 162 formed in the upper portion have a circular shape, while the through holes 164 formed in the lower portion have a square shape whose one side has the same length as the diameter of the through holes 162 formed in the upper portion. In this case, the through holes 164 formed in the lower portion can be made larger to an appropriate degree than the through holes 162 formed in the upper portion.

Figure 17:
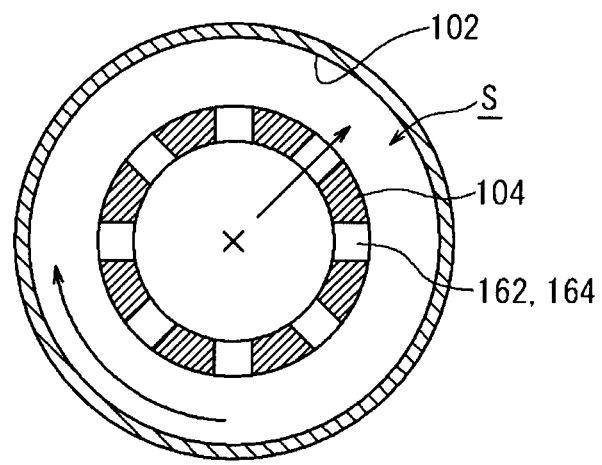
FIG. 17 is a cross-sectional view illustrating a cross section of an agitation member.

In the embodiment shown in FIG. 1, for example, the through holes 162 and 164 formed in the agitation member 104 penetrate through the agitation member 104 along radial directions of the agitation member 104, as schematically illustrated in FIG. 17. In this case, when the viscosity of the material L is high, the material L may clog the through holes 162 and 164, resulting in a decrease in process efficiency. In the present invention, the through holes formed in the agitation member 104 are not limited to the embodiment in which the through holes penetrate therethrough along radial directions.

Figure 18:
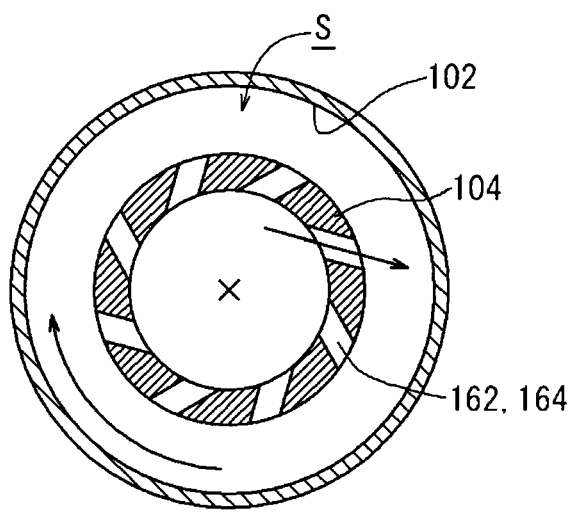
FIG. 18 is a cross-sectional view illustrating a cross section of an agitation member.

For example, as illustrated in FIG. 18, the through holes 162 and 164 may penetrate the agitation member 104 so as to be inclined with respect to radial directions of the agitation member 104. In this case, it is possible to adjust the directions and the flow strength of the material L that flows out from the through holes 162 and 164 toward the gap S between the agitation vessel 102 and the agitation member 104 because of the action of the centrifugal force. For example, as illustrated in FIG. 18, the through holes 162 and 164 may be formed so as to be inclined forward of the rotation direction of the agitation member 104, from an inner portion of the agitation member 104 toward an outer portion thereof.

In this case, it is expected that the flow strength of the material L flowing out from the through holes 162 and 164 toward the gap S between the agitation vessel 102 and the agitation member 104 becomes stronger by the action of the centrifugal force, making it possible to improve the process efficiency. In this case, since the flow strength of the material L can change depending on the inclination angle of the through holes 162 and 164, it is desirable that the angle at which the through holes 162 and 164 are inclined be set at an appropriate angle. In the example shown in FIG. 18, the through holes 162 and 164 are inclined at an angle of 45 degrees forward of the rotation direction of the agitation member 104, from the inner portion of the agitation member 104 toward the outer portion thereof.

When the through holes 162 and 164 are formed so as to be inclined with respect to radial directions of the agitation member 104, the configuration of the through holes is not limited to the one in which the through holes are inclined forward of the rotation direction of the agitation member 104 from an inner portion of the agitation member toward an outer portion thereof of the agitation member 104. In this case, the directions and the flow strength of the material L flowing out from the through holes 162 and 164 can be adjusted by the action of the centrifugal force associated with the inclination direction and angle of the through holes 162 and 164 with respect to radial directions of the agitation member 104. The inclination direction of the through holes 162 and 164 with respect to radial directions of the agitation member 104 may be determined taking into account how the direction and flow strength of the material L flowing out from the through holes 162 and 164 should be adjusted by the action of the centrifugal force.

For example, although not shown in the drawings, when it is desired to lower the flow strength of the material L flowing out from the through holes 162 and 164 by the action of the centrifugal force, the through holes 162 and 164 should be inclined backward of the rotation direction of the agitation member 104 from the inner portion of the agitation member 104 toward the outer portion thereof. On the other hand, when it is desired to direct the material L flowing out from the through holes 162 and 164 downward by the action of the centrifugal force, the through holes 162 and 164 should be inclined downward of the agitation member 104 from the inner portion of the agitation member 104 toward the outer portion thereof. By directing the material L flowing out from the through holes 162 and 164 downward, the material L can be circulated vertically within the agitation vessel 102, for example, so that the material L can be agitated more sufficiently.

Likewise, when it is desired to direct the material L flowing out from the through holes 162 and 164 upward by the action of the centrifugal force, the through holes 162 and 164 should be inclined upward of the agitation member 104 from the inner portion of the agitation member 104 toward the outer portion thereof. By directing the material L flowing out from the through holes 162 and 164 upward, the material L can be agitated while the material is being sent upward within the agitation vessel 102, for example, so that the process speed for the material L can be increased.

Moreover, when the through holes 162 and 164 are formed so as to be inclined with respect to radial directions of the agitation member 104, it is possible to appropriately combine the inclination with respect to the rotation direction of the agitation member 104 and the inclination with respect to the vertical direction of the agitation member 104. Furthermore, when the through holes 162 and 164 are formed so as to be inclined with respect to radial directions of the agitation member 104, it is possible to change the inclination direction of the through holes partially. For example, the through holes 164 formed in the lower portion of the agitation member 104 may be inclined forward of the rotation direction of the agitation member 104 from the inner portion of the agitation member 104 toward the outer portion thereof. Meanwhile, the through holes 162 formed in the upper portion of the agitation member 104 may be inclined upward of the agitation member 104 from the inner portion of the agitation member 104 toward the outer portion thereof. It is possible to change the inclination of the through holes 162 and 164 partially.

Figure 19:
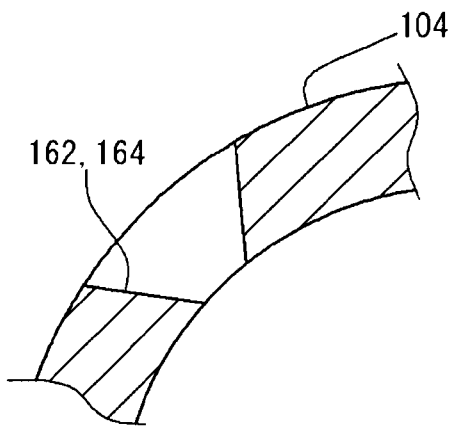
FIG. 19 is a cross-sectional view partially illustrating a cross section of an agitation member.

In addition, as illustrated in FIG. 19, the through holes of the agitation member 104 may be formed so as to be wider from the inner portion of the agitation member toward the outer portion thereof. On the other hand, although not shown in the drawings, the through holes of the agitation member 104 may be formed so as to be narrower from the inner portion of the agitation member toward the outer portion thereof. Such shapes of the through holes 162 and 164 may be combined as appropriate with the inclination thereof with respect to radial directions of the agitation member 104.

Various modified examples of the agitation apparatus 100, particularly those of the agitation member 104, have been illustrated hereinabove. However, the structures of the agitation apparatus 100 and the agitation member 104 are not limited to any of the foregoing embodiments. Moreover, the shape and structures of the components and portions of the agitation apparatus 100 may be changed in various ways. This agitation apparatus is suitable for an apparatus for agitating a material having a high viscosity, such as electrode slurry for lithium-ion secondary batteries. The agitation apparatus according to the present invention may be used, for example, for the process of agitating electrode slurry in a method of manufacturing a non-aqueous electrolyte secondary battery 10, as illustrated in FIG. 20, having mixture layers 12b and 14b formed by applying electrode slurries containing electrode active materials on respective metal foils 12a and 14a.

Figure 20:
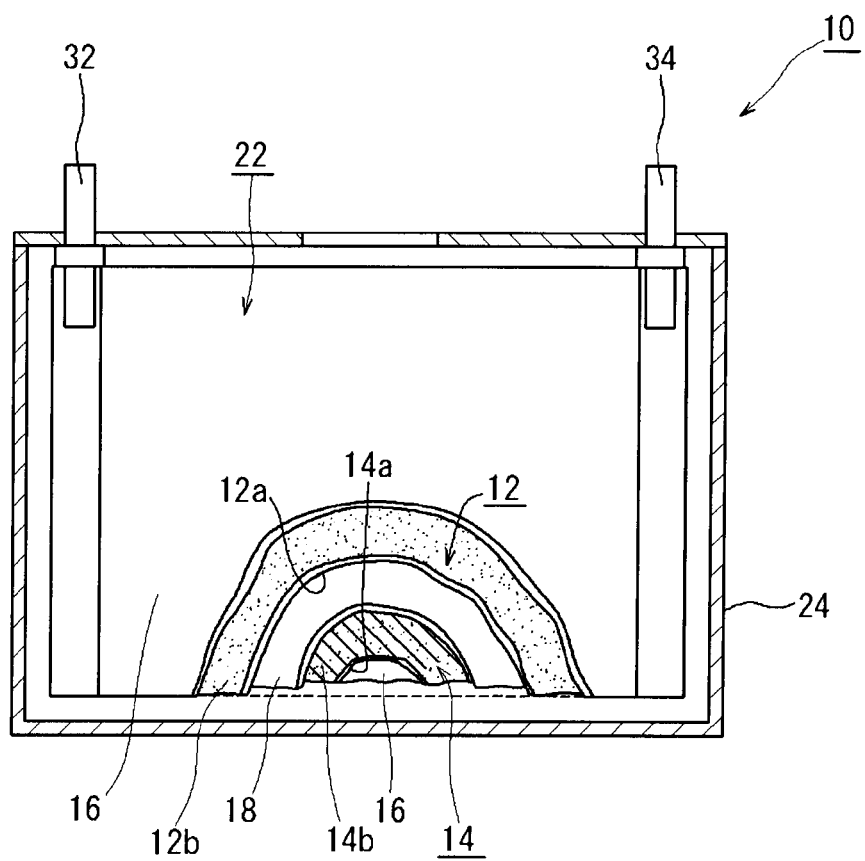
FIG. 20 is a view illustrating a non-aqueous electrolyte secondary battery.

The non-aqueous electrolyte secondary battery 10 shown in FIG. 20 has a spirally-wound electrode assembly 22, obtained by winding a strip-shaped positive electrode 12, a strip-shaped negative electrode 14, and strip-shaped separators 16 and 18 interposed therebetween. The spirally-wound electrode assembly 22 is accommodated in a battery case 24. To the wound electrode body 22, positive and negative electrode terminals 32 and 34 are attached. The strip-shaped positive electrode 12 has the mixture layer 12b formed by coating an aluminum foil 12a as a metal foil with an electrode slurry containing a positive electrode active material. The strip-shaped negative electrode 14 has the mixture layer 14b formed by coating a copper foil 14a as a metal foil with an electrode slurry containing a negative electrode active material. The agitation apparatus according to the present invention may be used for the process of agitating such electrode slurries for the positive electrode and the negative electrode. Although FIG. 20 illustrates an example of the non-aqueous electrolyte secondary battery 10 having the mixture layers 12b and 14b formed by applying the electrode slurries containing the electrode active materials onto the respective metal foils 12a and 14a, the non-aqueous electrolyte secondary battery is not limited to such an embodiment.

The agitation apparatus according to the present invention may be used, not only in uses for agitating electrode slurry for lithium-ion secondary batteries, but in various uses for agitating a material having a high viscosity.

Reference Signs List
10—Non-aqueous electrolyte secondary battery
12—Positive electrode
14—Negative electrode
12a, 14a—Metal foil
12b, 14b—Mixture layer
16, 18—Separator
22—Wound electrode body
24 Battery case
32, 34—Electrode terminal
100—Agitation apparatus
102—Agitation vessel
102a—Upper case
102b —Lower case 102c—Weir plate
104, 104A, 104B, 104C, 104D, 104E, 301, 302—Agitation member
106—Outer vessel
112, 114—Flange
116—Coolant chamber
118—Lid
120—Discharge port
122—Flange
124a, 124b—Supply port
126a, 126b—Supply valve
128a, 128b—Supply pipe
132—Hole
134—Recess
142—Coolant chamber
144—Coolant supply pipe
150—Rotation shaft
152—Cylindrical portion
154—Arm portion
154a—Hole
156—Boss portion
156a—Fitting hole
160—Mid-portion
162—Through hole
164—Through hole
200—Driving apparatus
L—Material
S—Gap between agitation vessel and agitation member
S1—Gap at upper portion
S2—Gap at lower portion
D1—Inner diameter of upper portion of agitation vessel
D2—Inner diameter of lower portion of agitation vessel
φ1—Outer diameter of upper portion of agitation member
φ2—Outer diameter of lower portion of agitation member

The invention claimed is:

1. An agitation apparatus comprising:
a substantially cylindrically shaped agitation vessel;
a rotation shaft provided along a central axis of the agitation vessel;
a substantially cylindrically shaped agitation member having an outer diameter smaller than the inner diameter of the agitation vessel and attached to the rotation shaft so as to rotate concentrically with the inner circumferential surface of the agitation vessel, the agitation member including an upper portion and a lower portion, the upper portion being above the lower portion in a vertical direction;
a plurality of supply ports arranged at a lower portion of the agitation vessel;
a discharge port arranged at an upper portion of the agitation vessel, above the agitation member;
a plurality of through holes formed in radial directions through the agitation member, including a plurality of through holes formed in the upper portion and a plurality of through holes formed in the lower portion, wherein
the central axis of the agitation vessel is arranged along the vertical direction, and
a gap between the inner circumferential surface of the agitation vessel and the outer circumferential surface of the agitation member is partially varied between the upper portion and the lower portion of the agitation member.

2. The agitation apparatus according to claim 1, wherein the upper portion and the lower portion each has a different outer diameter from the other.

3. The agitation apparatus according to claim 1, wherein the inner diameter of the agitation vessel is different at the upper portion of the agitation member and at the lower portion of the agitation member.

4. The agitation apparatus according to claim 1, wherein the gap between the inner circumferential surface of the agitation vessel and the outer circumferential surface of the agitation member is wider at the lower portion of the agitation member than at the upper portion of the agitation member.

5. The agitation apparatus according to claim 4, wherein the outer diameter of the agitation member is smaller in the lower portion than in the upper portion.

6. The agitation apparatus according to claim 5, wherein the agitation member has a tapered shape such that the outer diameter thereof becomes gradually smaller from the upper portion toward the lower portion.

7. The agitation member according to claim 4, wherein the inner diameter of the agitation vessel is smaller at the upper portion of the agitation member than at the lower portion of the agitation member.

8. The agitation apparatus according to claim 4, wherein the ratio (S10/S20) of a gap S10 between the agitation vessel and the agitation member at an upper end of the agitation member to a gap S20 between the agitation vessel and the agitation member at a lower end of the agitation member is equal to or less than 0.95 (0.95≥S10/S20).

9. The agitation apparatus according to claim 1, wherein the gap between the inner circumferential surface of the agitation vessel and the outer circumferential surface of the agitation member is wider at the upper portion of the agitation member than at the lower portion of the agitation member.

10. The agitation apparatus according to claim 9, wherein the outer diameter of the agitation member is smaller in the upper portion than in the lower portion.

11. The agitation apparatus according to claim 10, wherein the agitation member has a tapered shape in which its outer diameter becomes gradually smaller from the lower portion thereof toward the upper portion thereof.

12. The agitation apparatus according to claim 9, wherein the inner diameter of the agitation vessel is smaller at the lower portion of the agitation member than at the upper portion of the agitation member.

13. The agitation apparatus according to claim 9, wherein the ratio (S10/S20) of a gap S10 between the agitation vessel and the agitation member at an upper end of the agitation member to a gap S20 between the agitation vessel and the agitation member at a lower end of the agitation member is equal to or greater than 1.05 (1.05≤S10/S20).

14. The agitation apparatus according to claim 1, wherein ones of the through holes formed in the lower portion of the agitation member are larger than ones of the through holes formed in the upper portion of the agitation member.

15. The agitation apparatus according to claim 1, wherein the through holes are inclined with respect to radial directions of the agitation member.

16. The agitation apparatus according to claim 1, wherein the through holes penetrate through the agitation member so as to be inclined forward of a rotation direction of the agitation member, from an inner portion of the agitation member toward an outer portion thereof, with respect to radial directions of the agitation member.

* * * * *